US008157501B2

(12) United States Patent
Semov

(10) Patent No.: US 8,157,501 B2
(45) Date of Patent: Apr. 17, 2012

(54) VERTICAL AXIS SAIL-TYPE WINDMILL POWER TRANSFER DEVICE

(76) Inventor: Sevdalin Semov, Cranbury, NJ (US)

( * ) Notice: Subject to any disclaimer, the term of this patent is extended or adjusted under 35 U.S.C. 154(b) by 728 days.

(21) Appl. No.: 12/258,422

(22) Filed: Oct. 26, 2008

(65) Prior Publication Data

US 2009/0074577 A1 Mar. 19, 2009

(51) Int. Cl.
    *F03D 7/00* (2006.01)
(52) U.S. Cl. .......................................... 415/4.2; 415/4.4
(58) Field of Classification Search .................. 415/4.2, 415/4.4; 290/55; 416/11, 132 B
    See application file for complete search history.

(56) References Cited

U.S. PATENT DOCUMENTS

| 7,413,404 | B2 | 8/2008 | Chio | 416/17 |
| 7,780,416 | B2 | 8/2010 | Al-Azzawi | 416/111 |
| 2005/0196279 | A1 * | 9/2005 | Hartman | 416/117 |
| 2008/0181777 | A1 * | 7/2008 | Bailey | 416/117 |

* cited by examiner

*Primary Examiner* — Ross Gushi
(74) *Attorney, Agent, or Firm* — Watov & Kipnes, P.C.; Kenneth Watov

(57) ABSTRACT

This invention relates to a vertical axis sail-type windmill power transfer device for efficiently harvesting wind power by increasing the effective surface of interaction with the wind where the sails are formed by a plurality of pairs of blades permanently attached to freely rotating horizontal rods penetrating the vertical output shaft with pivot offset of the center of the weight which causes the blades to self-adjust when impacted by wind so that one blade assumes a driving position while the other—a leeward position. The invention has a modular-type structure which permits for a variety of configurations and allows for photovoltaic cells to be placed on the blades in order to complement the production of wind energy with solar energy.

9 Claims, 10 Drawing Sheets

PERSPECTIVE VIEW

PERSPECTIVE VIEW

PERSPECTIVE VIEW

TOP VIEW

PERSPECTIVE VIEW

DETAIL SECTION

PERSPECTIVE VIEW

DETAIL SECTION

PERSPECTIVE VIEW

DETAIL SECTION

PERSPECTIVE VIEW

DETAIL SECTION

PERSPECTIVE VIEW

DETAIL SECTION

PERSPECTIVE VIEW

PERSPECTIVE VIEW

US 8,157,501 B2

VERTICAL AXIS SAIL-TYPE WINDMILL POWER TRANSFER DEVICE

REFERENCE TO RELATED APPLICATIONS

U.S. Pat. No. 7,413,404 B2 Aug. 19, 2008

BACKGROUND OF THE INVENTION

This invention relates to a sail-type windmill power transfer device for producing electrical or mechanical power in any environment where wind is present. Thus, this invention pertains to the field of natural renewable energy.

The windmill as a device has been utilized by mankind for hundreds of years because of its usefulness in converting wind power into mechanical power and, more recently, into electrical power.

Generally, wind generators can be subdivided into two categories—horizontal axis wind generators (HAWG) and vertical axis wind generators (VAWG), depending on the orientation of the main rotor shaft. A major difference between these subcategories is the fact that, in the case of HAWGs, the main rotor and electrical generator are positioned at the top of the windmill tower, while in the case of VAWGs they are placed close to or on the ground, thus simplifying the latter's construction and reducing the costs of maintenance. Also, HAWGs do not orient themselves toward the wind, which is their main deficiency, and may be less efficient harvesting winds closer to the ground surface where wind is slower. HAWGs used nowadays in modern wind farms tend to have high installation and maintenance costs and may cause visual or noise pollution.

VAWGs, on the other hand, do not need to be pointed toward the wind and operate in an environment where wind direction is not constant in terms of force or direction. Consequently, such turbines do not need to be mounted on high towers but may operate near to the ground or on building rooftops. Like HAWGs, however, the typical VAWG has some drawbacks, including the loss of efficiency due to the drag caused when the blades rotate into the wind. Thus, the objective of this invention is the design of a VAWG that utilizes the strengths of this subcategory of windmill turbines, namely efficiency in construction, operation and maintenance, while minimizing the loss of efficiency associated with the drag of the blades returning into the wind.

In addition, the invention herein proposed offers multiple other improvements over traditional wind generators. It is designed to have few moving parts thus simplifying the processes of its construction and operation, but also increasing the efficiency of harvesting wind power. By the nature of its design it also provides for ease of installation and maintenance, specifically because the proposed wind power transfer device can be positioned closer to the ground surface than many devices on the market today allow for. This invention also allows for the construction of modular wind turbines so that the final design may combine any number or variation of modules, each constructed based on the principles of the invention herein described. Thus, the proposed device is highly versatile as each wind turbine may be tailored in different modular configurations depending on the circumstances. Another major advantage is that this invention incorporates the placement of photovoltaic cells on the blades of the windmill generator to capture solar energy in addition to wind energy so produced.

BRIEF SUMMARY OF THE INVENTION

The purpose of the vertical axis sail type windmill power transfer device proposed in this invention is to transform multi-directional wind power to the mechanical power needed to drive an electric generator. The sail dragging effect is achieved by using plurality of pairs of blades that are permanently attached to freely rotating horizontal rods penetrating the vertical output shaft. Each blade is preferably in airfoil shape and is fastened symmetrically on each side of the horizontal rod by a spring-type safety mechanism. Each blade is oriented at 90 degrees with respect to the other. The center of the weight of each blade is offset from the pivot which causes the blades to constantly self-adjust when impacted by wind coming from any direction so that one blade assumes a driving position when the opposite blades assumes a leeward position. When a plurality of groups of pairs of blades are spaced vertically along the vertical output shaft and when the blades are impacted by wind, sails are formed, one upwind and one leeward. Each pair of blades utilizes both the force of wind and the force of gravity to harvest the energy of the wind in a highly efficient manner which consequently rotates the vertical output shaft.

A spring-type mechanism secures the blades in place when they are in their optimal position but also forces them to narrow the angle between the opposite blades under extreme-wind conditions so that the area of wind reception is reduced in order to protect the blades, as well as the entire structure, from damage.

In the preferred embodiment of this invention, the above-mentioned support structure comprises a base on the upper part of which is a roller bearing connection. The base is secured to the ground with a number of legs, providing support to the entire structure. In the space underneath is placed a direct-drive power generator or a generator with a gearbox. The vertical output shaft of the windmill is conjoined to the roller bearing block of the base and connects to the generator, which provides stability to the entire structure, simplifies the design, and reduces the number of moving parts thus increasing the efficiency of the windmill in producing energy. Additionally, an anemometer is positioned at the top of the vertical output shaft for measuring speed of the wind in case there is a need for digital control of the generator or gearbox.

It is an object of the present invention to provide a vertical axis sail-type windmill power transfer device to convert wind power into the mechanical power needed to drive an electrical generator with a high degree of efficiency.

Another object of the present invention is to convert wind power into the mechanical power needed to drive an electricity generator in any environment where even the slightest wind is present and without regard to its direction and without the need to alter the angle of wind reception in response to changes in wind direction.

As such, another object of this invention is to produce a device that is capable of being used in populated areas as well as in open areas, such as wind farms.

Yet another object of this invention is to provide a device that has low installation and maintenance costs; that produces low visual and noise pollution effects, and that has a low environmental impact.

Yet another object of this invention if to provide a device capable of maintaining its structural integrity under impact with winds of very high velocity or turbulence.

Still another object of this invention is to provide for the simultaneous harvesting of two types of natural renewable energy, namely wind and solar power, as the design of the device conceives the placement of photovoltaic cells on the blades of the sails.

Still another object of this invention is to provide a device that offers a high degree of flexibility to its users. The structure is designed in a modular style which permits it to be produced and assembled in a great number of combinations depending on the needs of its users as well as the environment where it is used.

Because this invention allows for a high degree of versatility in terms of the arrangement of the blades and the modular structures that can be formed on the basis of the preferred or other embodiments, it is to be understood that this invention is not limited in its purpose, design or uses to the construction or arrangement described in this text or conveyed in the drawings. Similarly, the terminology or language used to describe the invention should not be regarded as limiting.

DETAILED DESCRIPTION OF THE INVENTION

Figure 1:
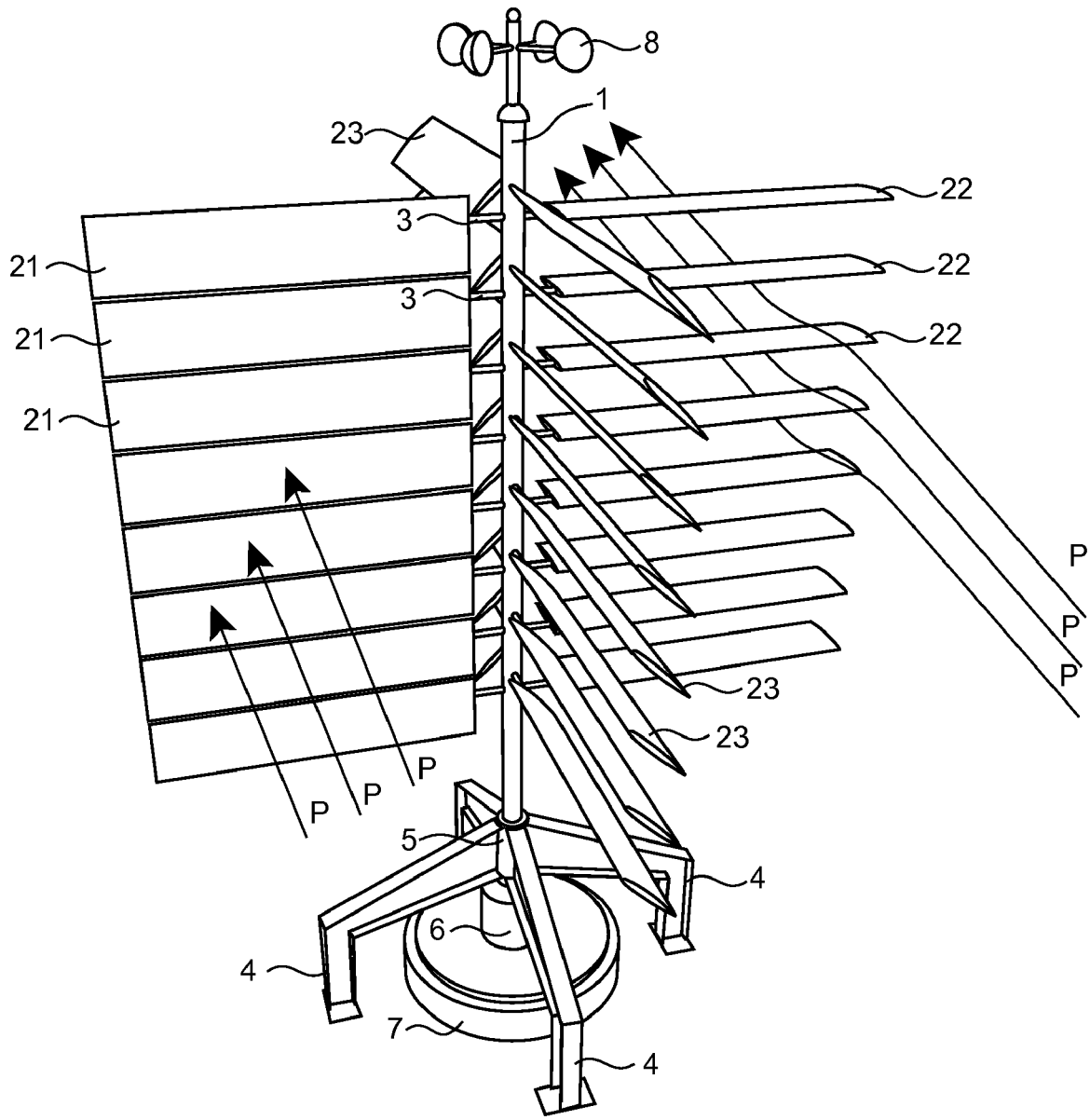
FIG. 1 is a perspective view of the present invention.

FIG. 1 presents a perspective view of the basic embodiment of the present invention, a vertical axis sail-type windmill power transfer device for efficiently harvesting wind power by increasing the effective surface of interaction with the wind (P). This embodiment describes the basic principles on which this invention is based. The sail dragging effect is achieved by using plurality of pairs of blades (21, 22, 23) that are permanently attached to a plurality of freely rotating horizontal rods (3), respectively. Each rod (3) penetrates the vertical output shaft (1), with each associated blade of a pair of blades being mounted on rod 3 portions, respectively, on directly opposing sides of the output shaft (1). Each blade is preferably in airfoil shape and is fastened symmetrically on each side of the horizontal rod (3) by a spring-type safety mechanism (9 FIG. 7a, b). Each opposing blade of each pair of blades lie in the same plane and under normal operating conditions are oriented at 90 degrees with respect to each other. The center of the weight (W) of each blade is offset from the pivot which causes the blades to constantly self-adjust when impacted by wind (P) coming from any direction so that one blade assumes a driving position (21) when the opposite blade assumes a leeward position (22). When a plurality of groups of pairs of blades are spaced vertically along the vertical output shaft (1) and when the blades are impacted by wind (P), sails are formed, one upwind and one leeward. Each blade on the windward side rotates with its associated rod (3) to have the wind (P) forced against substantially the total area of the blade, thereby utilizing both the force of wind (P) and the force of gravity (G) to harvest the energy of the wind (P) in a highly efficient manner which consequently rotates the vertical output shaft (1). For each pair of blades, as a blade on the windward side rotates with its associated rod (3), the opposing other blade of the pair of blades rotates with the associated rod (3).

A spring-type mechanism (9 FIG. 7a, b) secures the blades (21, 22, 23) in place when they are in their optimal position (21) but also forces them to narrow the angle between the opposite blades under extreme-wind conditions so that the area of wind reception is reduced in order to protect the blades, as well as the entire structure, from damage.

The windmill also includes a support structure. In one embodiment of this invention, the support structure comprises a foundation on the upper part of which is a roller bearing connection (5). The foundation is secured to the ground with a number of legs (4), providing support to the entire structure. In the space underneath is placed a direct-drive power generator or a generator (7) with a gearbox (6). The vertical output shaft (1) of the windmill is conjoined to the roller bearing block (5) of the base and connects to the generator (7), which provides stability to the entire structure, simplifies the design, and reduces the number of moving parts thus increasing the efficiency of the windmill in producing energy.

Additionally, an anemometer (8) is positioned at the top of the vertical output shaft (1) which additionally increases the effectiveness of producing wind energy to maximize the output of electricity per amount of wind available by measuring the speed of the wind in case there is a need for a digital control of the generator (7) or gearbox (6).

Figure 8:
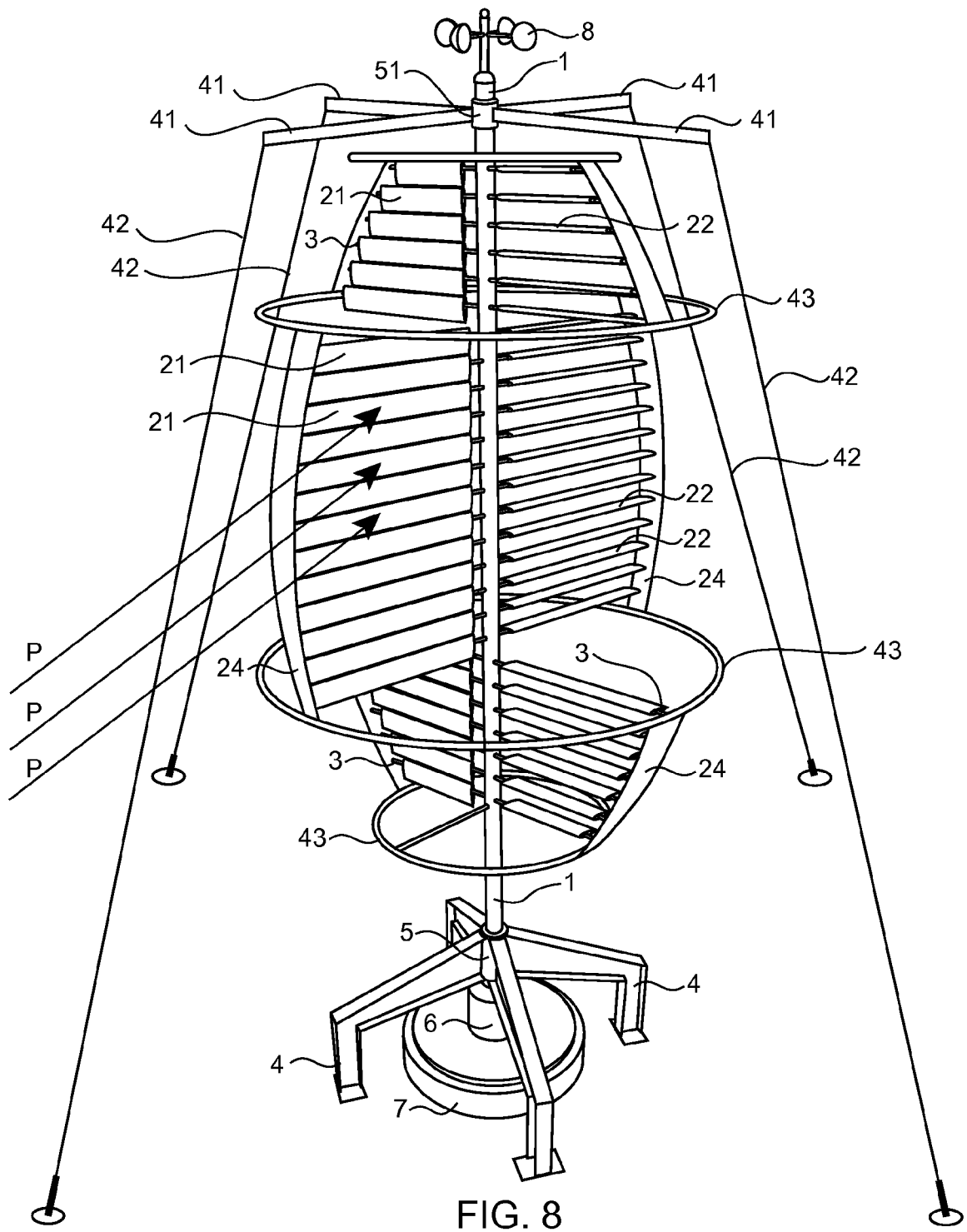
FIG. 8 is a perspective view of one embodiment of this invention showing the possibility of combining any number of modules in different arrangements as to increase the impact of the wind with the sails to prevent the overlapping of the sails.

Depending on the height of the structure it can also be supported from the top by using another bearing block (51 FIG. 8) and arms (41 FIG. 8) secured to the ground with steel ropes (42 FIG. 8). Alternatively, arms may connect the tops of a multitude of windmills together such as when these devices are used in a wind farm.

Figure 2:
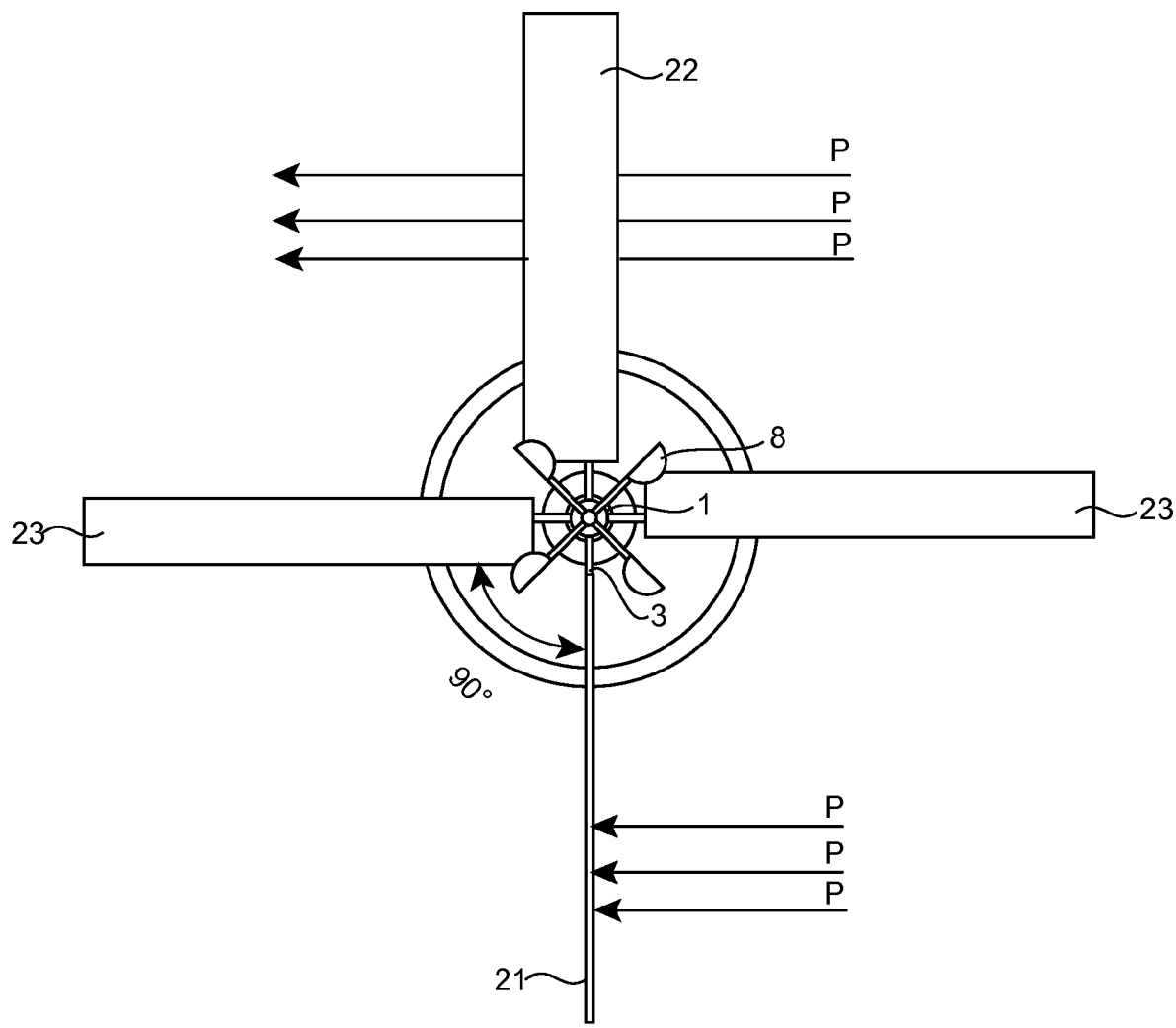
FIG. 2 is a top view of the present invention.

FIG. 2 presents a top view of the basic embodiment of the present invention. To overcome a potential stow of the sails when the axis of the blades (23) is oriented parallel to the direction of the wind, the base embodiment of this invention includes a minimum of two pairs of blades positioned perpendicularly with respect to each other so that at least one sail is in optimal position (21). Other embodiments discussed below enhance this principle by arranging the pairs of blades in different configurations.

Figure 3A:
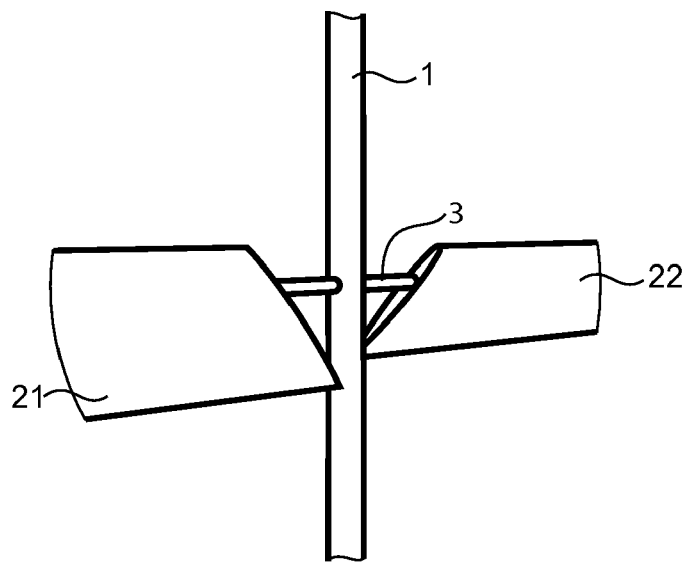
FIG. 3a (perspective view) and FIG. 3b (detail view) are detail views of the pairs of blades when no wind is present.
Figure 3B:
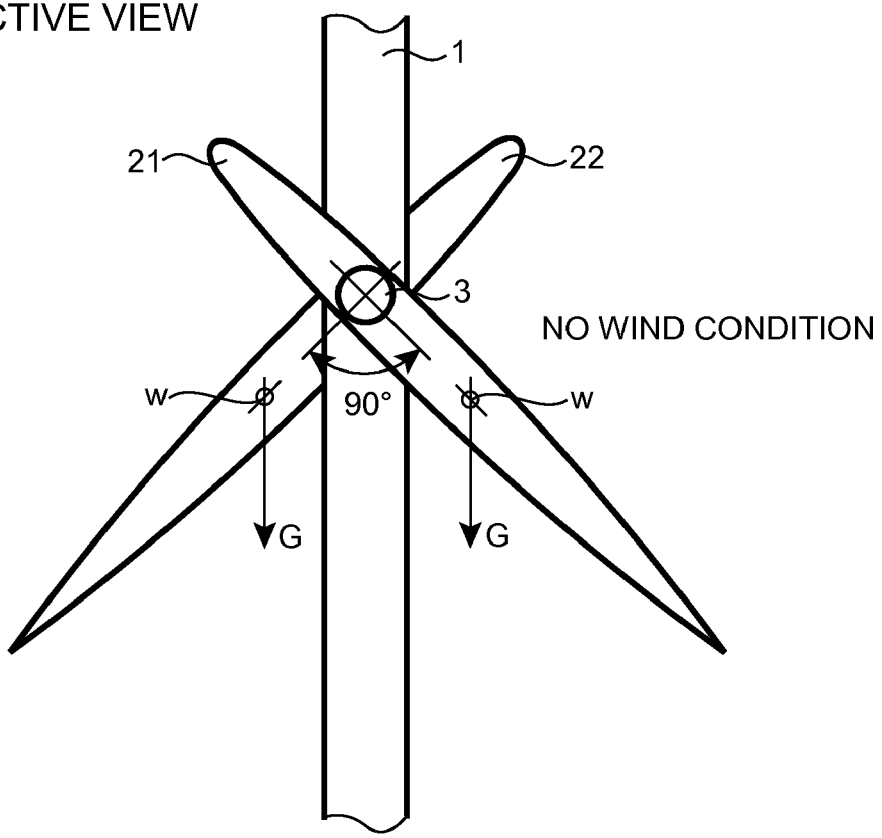

FIGS. 3a and 3b describe the position of the blades (21, 22) in the absence of wind. In such conditions, the blades tend to balance themselves. Because their centers of weight (W) are offset from the pivot, the blades (21, 22) tend to orient themselves at a 45-degree angle with respect to the vertical output (1) shaft.

Figure 4A:
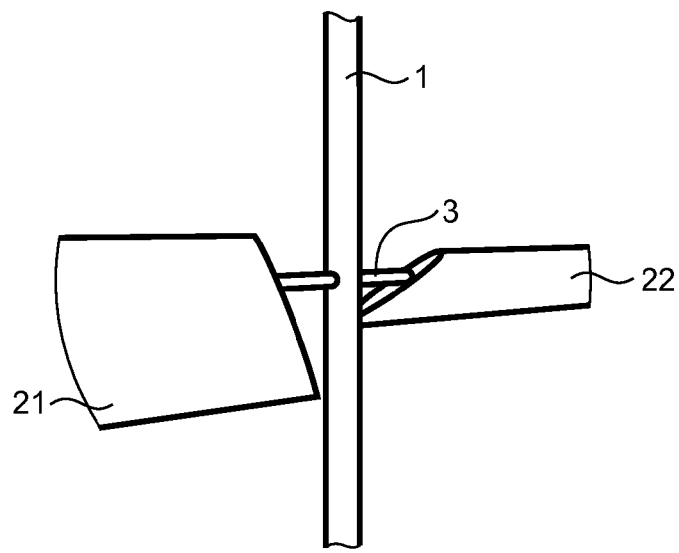
FIG. 4a (perspective view) and FIG. 4b (detail view) are detail views of the pairs of blades when impacted by slow wind.
Figure 4B:
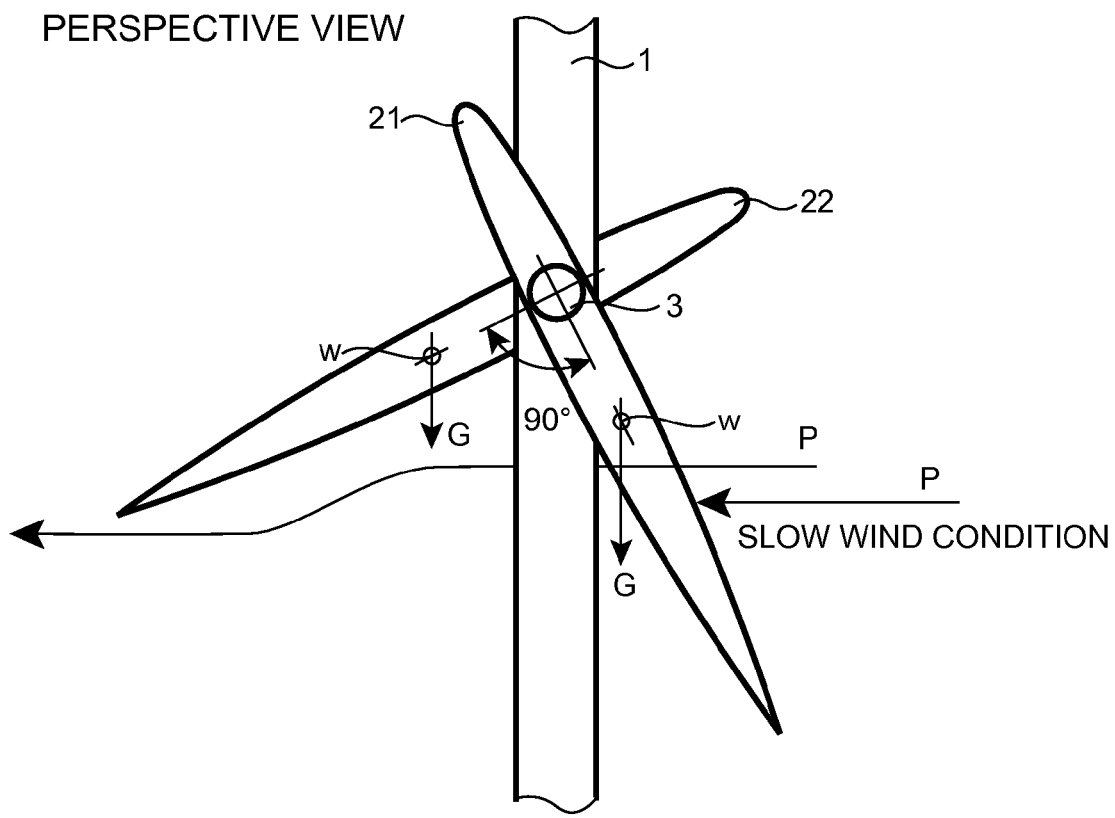

As shown in FIGS. 4a and 4b, when impacted by slow wind (P), the windward blade (21) tends to reduce its angle with respect to the vertical output shaft (1), while the opposite, leeward blade (22) would orient itself to a low-resistance position. This effect is achieved because the force of the wind (P) counteracts the force of gravity (G). The angle between the two blades remains at 90 degrees. When this situation occurs, the wind (P) attacking the driving sail provides the force to rotate the vertical output shaft (1).

Figure 5A:
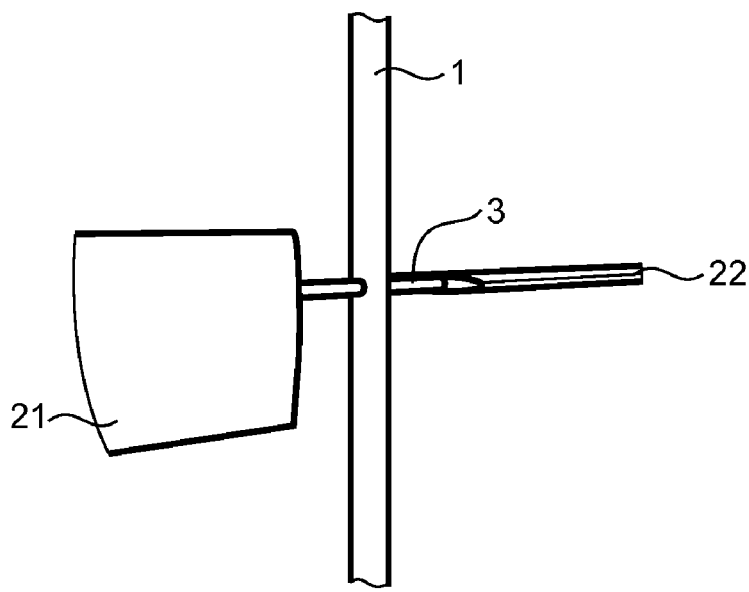
FIG. 5a (perspective view) and FIG. 5b (detail view) are detail views of the pairs of blades when the blades are in their optimal driving position.
Figure 5B:
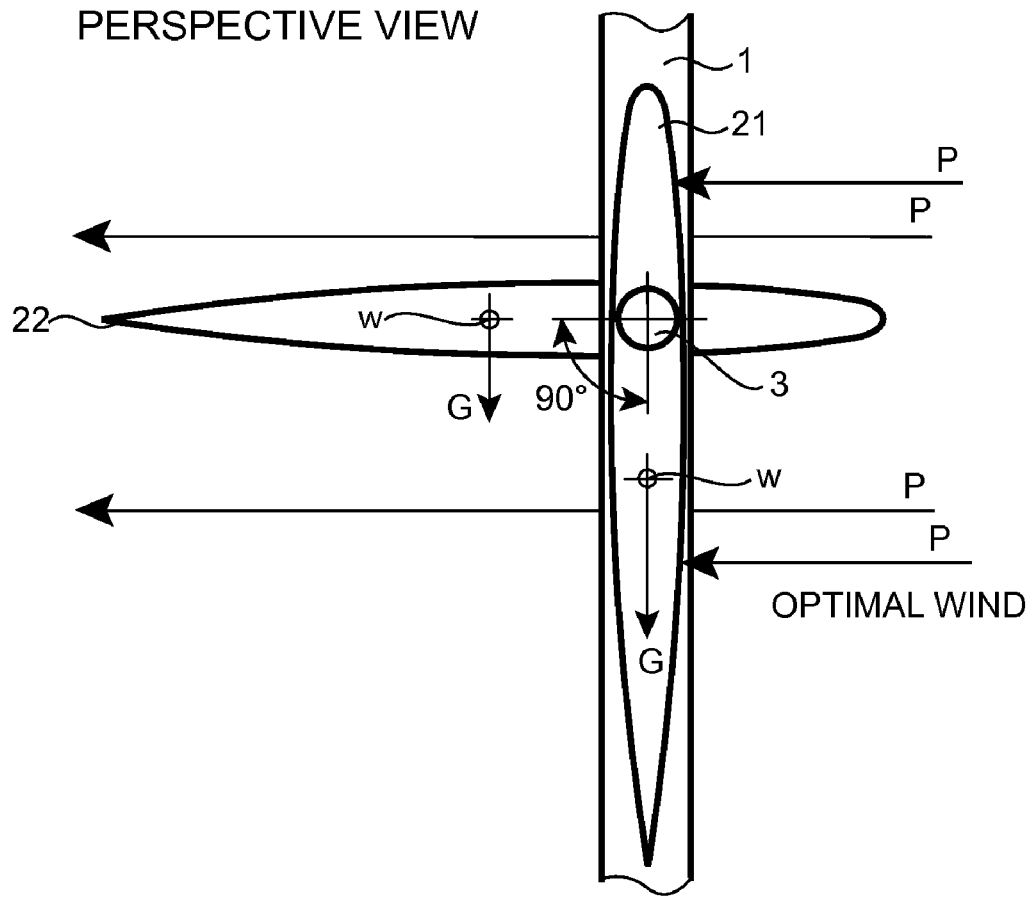

As illustrated in FIGS. 5a and 5b the optimal condition is when the leeward blade (22) is parallel to the direction of the wind while the other one (21) is perpendicular to said direction.

Figure 6A:
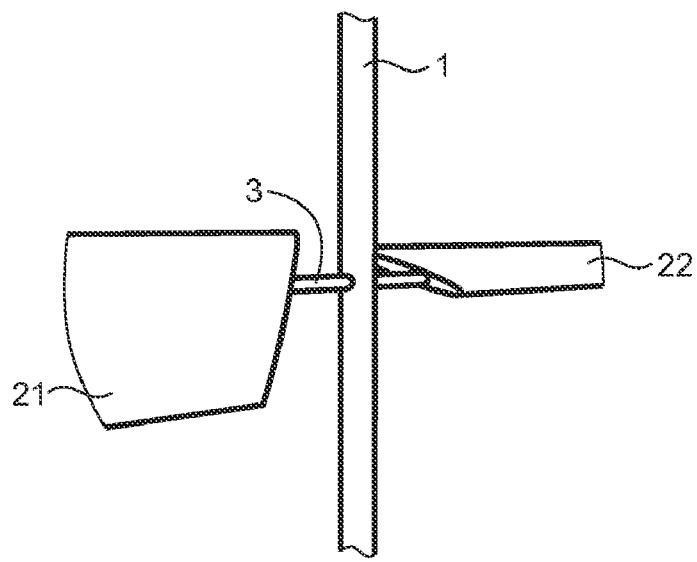
FIG. 6a (perspective view) and FIG. 6b (detail view) are detail views of the pairs of blades when impacted by strong wind.
Figure 6B:
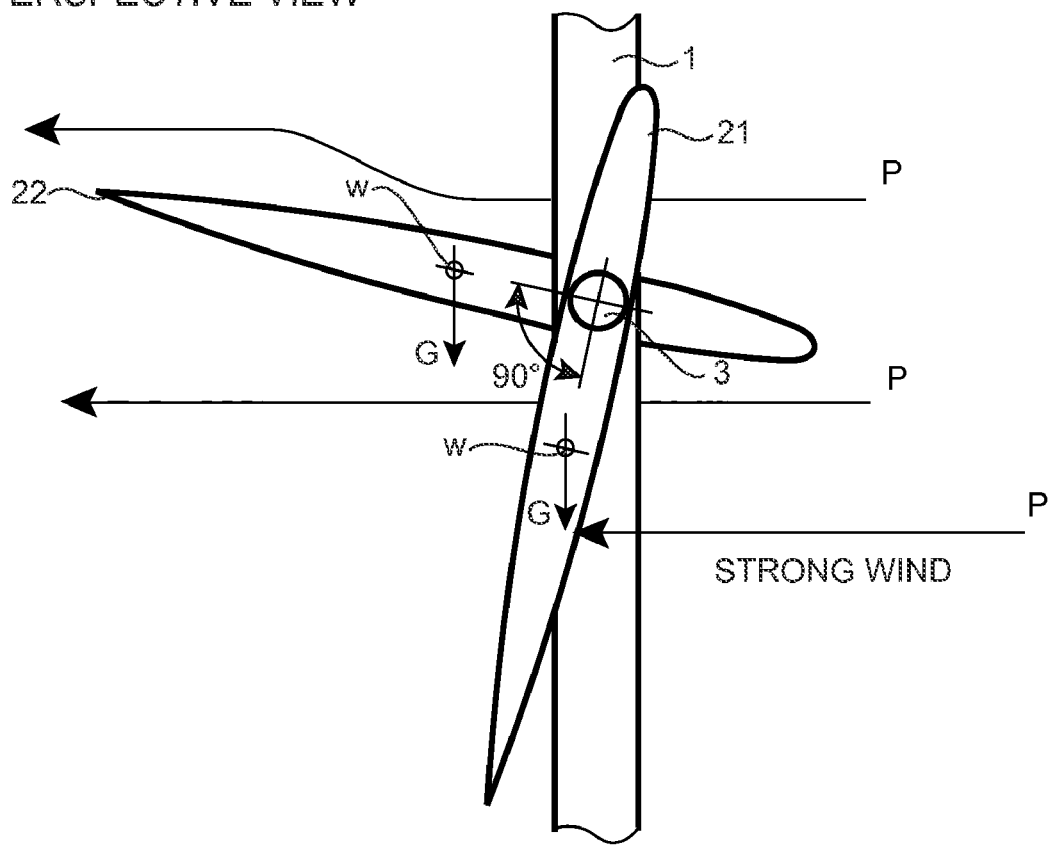

FIGS. 6a and 6b show the condition when blades (21, 22) are impacted by strong wind. Because the nature of wind power (P) implies a constantly changing speed and direction the proposed design and position of the blades tend to assume optimal position combining aerodynamics and gravity.

Figure 7A:
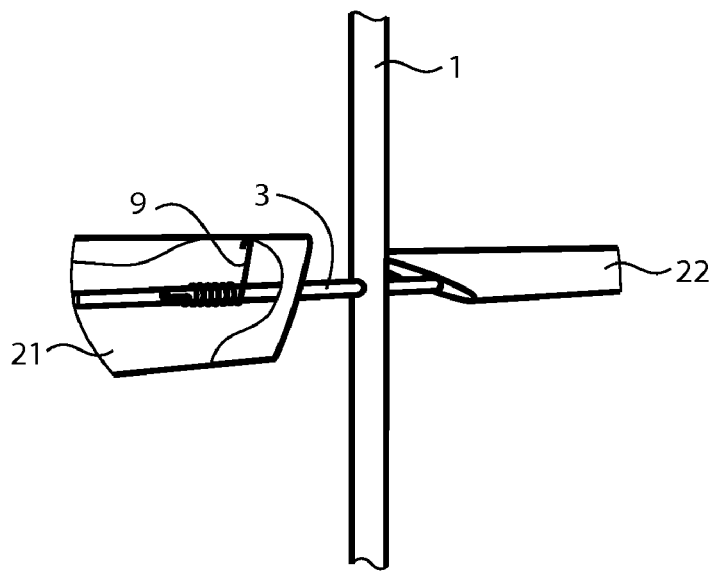
FIG. 7a (perspective view) and FIG. 7b (detail view) are detail views of the pairs of blades when impacted by wind with extremely high speed or turbulence, which activates the safety mechanism incorporated in this invention so as to protect the structure of the windmill from damage.
Figure 7B:
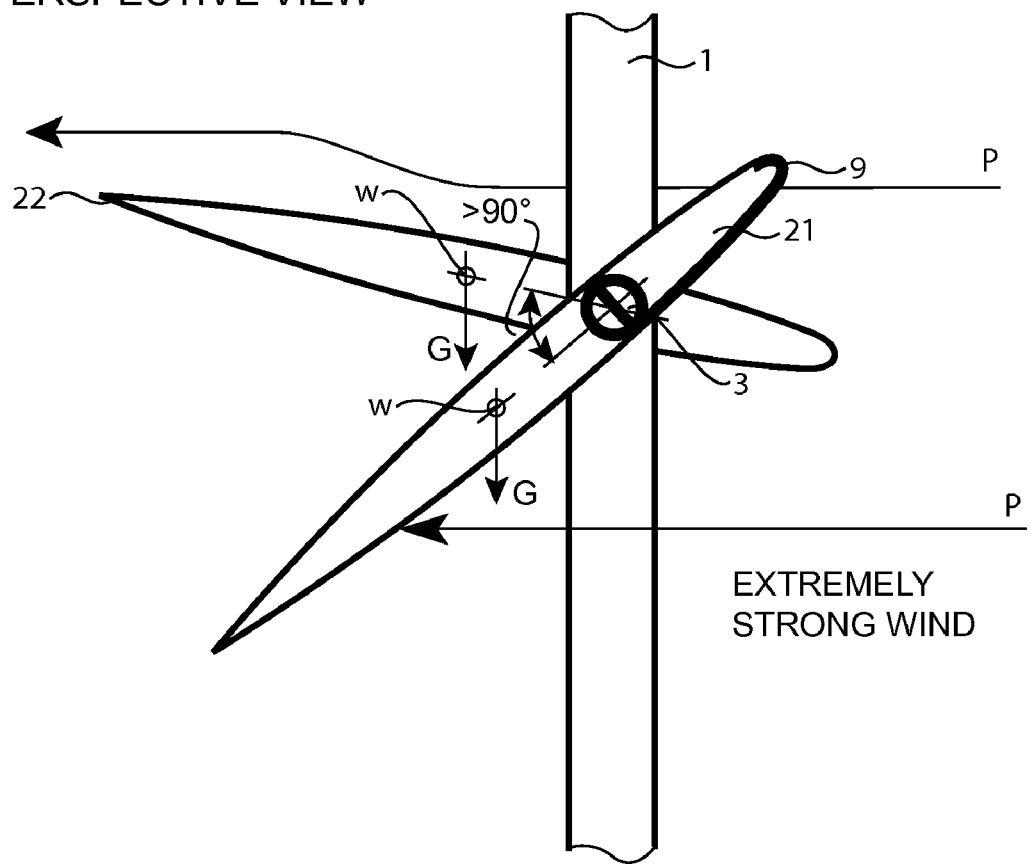

FIGS. 7a and 7b present a spring-type mechanism (9) that secures the blades (21, 22) in place when they are in their optimal position but also forces them to narrow the angle between the opposite blades under extreme wind (P) conditions so that the area of wind reception is reduced in order to protect the blades, as well as the entire structure, from damage.

FIG. 8 presents a perspective view of the preferred embodiment of the present invention when sails formed by groups of pairs of blades are spaced vertically along the vertical output shaft (1) to prevent overlapping when they interact with the wind. As illustrated in FIG. 8 the support structure could be enhanced by adding arms (41) resting on the roller bearing box (51) at the high end of the vertical output shaft (1) secured to the ground with tension steel cables (42). Also, additional vertical wings (24) held in place by a series of horizontal rings (43) support the ends of the horizontal rods (3) and help the formed sails to continue rotating when they become parallel to the wind direction (P)

Figure 9:
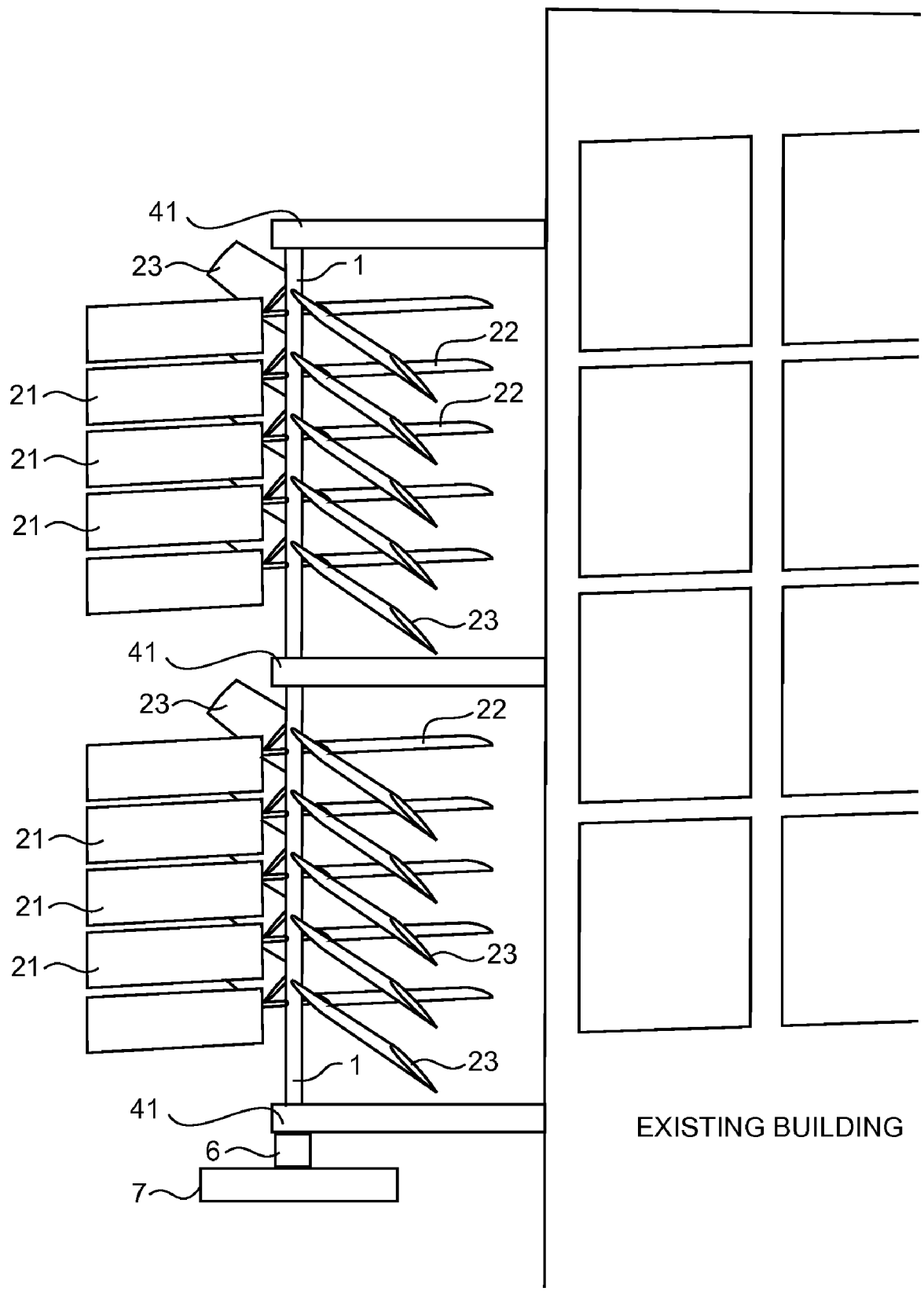
FIG. 9 is a perspective view of one embodiment of this invention showing the possibility of supporting it from the side of an existing structure.

FIG. 9 illustrates the present invention when the structure could be supported from the side of an existing structure, for example an existing building. In that case the sails formed by horizontal blades can be used as a kinetic advertising billboard.

Figure 10:
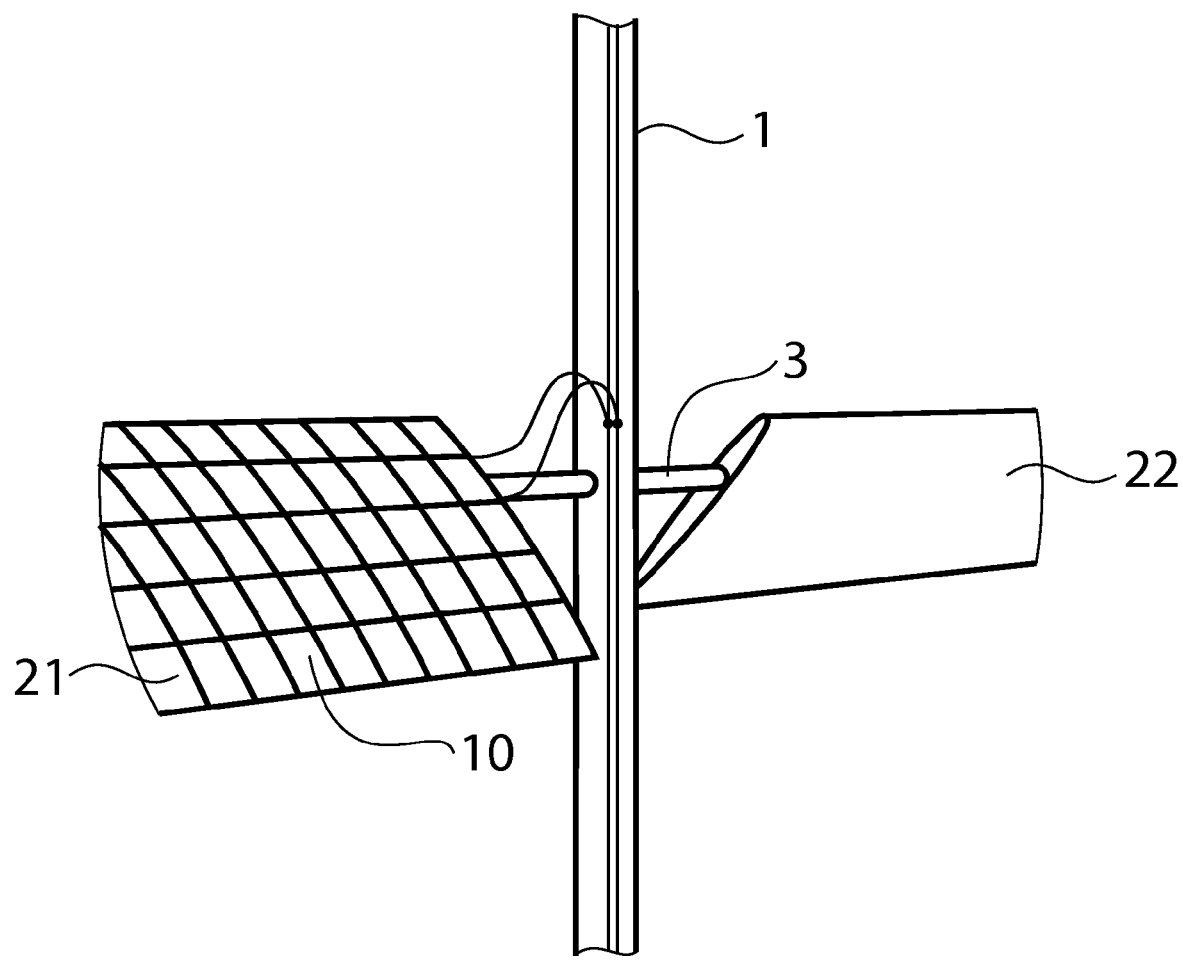
FIG. 10 is detail view of the pairs of blades when the placement of photovoltaic cells on the blades is incorporated.

FIG. 10 is a perspective detail view of a fraction of the present invention when the surface of the horizontal blades (21) are covered with a thin layer of photovoltaic cells (10) to provide for the simultaneous harvesting of two types of natural renewable energy, namely wind and solar power

The invention claimed is:

1. A vertical axis sail-type windmill power transfer device designed to enhance the capacity of transforming multi-directional wind power to the rotational power of an electric generator by increasing the effective surface of interaction with the wind, said device comprising:
    a rotational vertical output shaft;
    a plurality of vertically spaced apart freely rotating horizontal rods each penetrating through said vertical output shaft;
    sails formed by a plurality of pairs of blades, each blade of said pairs of blades being securely mounted on portions of one of said freely rotating horizontal rods on directly opposing sides of said vertical output shaft, with the blades on one side of said vertical output shaft being parallel to one another and normally oriented at 90 degrees with their associated other blades on the other side of said output shaft, whereby said blades are constantly self-adjusting when impacted by wind so that at least one sail formed by blades on one side of said vertical output shaft is always in an optimal driving position, whereas the opposite sail formed by blades on the other side of said vertical output shaft is in a leeward position;
    wherein each pair of blades utilizes both the force of gravity and the force of wind to harvest the energy of the wind in a highly efficient manner which consequently rotates the vertical output shaft;
    wherein each blade of each pair of blades has an airfoil shape, with the center of the weight of each blade being offset from its associated horizontal rod, thereby enhancing the self-adjustment feature of said blades so that when they are impacted by wind one blade assumes a driving position with its main surface perpendicular to the wind for maximizing the wind force against it, and its associated opposite blade assumes a leeward position and has a leading airfoil edge parallel to the wind for minimizing the wind force against it;
    a foundation comprising a bearing block and an electrical generator or other mechanical device utilizing the energy so produced, where said foundation is attached to the rotational vertical output shaft; and
    a spring-type mechanism individually mounted on a portion of each rod on opposing sides of said output shaft for both securing associated blades in place when they are in their optimal driving position, and for also forcing the wind driven blades of each pair of blades to narrow the angle between their horizontal opposing blades to less than 90 degrees under extreme-wind conditions so that the area of wind reception is reduced in order to protect the blades, as well as the entire structure, from damage.

2. The device as claimed in claim 1, wherein said device is composed of any number of modules of one or two pairs of blades vertically spaced along the vertical output shaft and based in their design and construction on the principles described in this invention.

3. The device as claimed in claim 1, where said device is free standing or is secured from the top by using another bearing block and arms secured to the ground with steel ropes or where arms connect the tops of a multitude of windmills together.

4. The device as claimed in claim 1, wherein said device is used in both open areas and urban/populated areas, whether free-standing or attached to the tops or sides of existing structures, to harvest wind power for industrial, commercial, or residential uses.

5. The device as claimed in claim 1, wherein the blades are equipped with photovoltaic cells to complement the production of wind energy with solar energy.

6. A vertical axis sail-type windmill power transfer device, comprising:
    a rotational vertical output shaft;
    a plurality of vertically spaced apart freely rotating horizontally positioned rods each penetrating and thereby having portions on opposing sides of said vertical output shaft;
    a plurality of pairs of blades;
    a means for securing each blade of each pair of said plurality of pairs of blades oriented normally at 90 degrees to one another on portions of one of said freely rotating horizontal rods on directly opposing sides of said vertical output shaft, whereby said plurality of pairs of blades form sails on either side of said vertical output shaft, and each blade rotates with its opposing blade on their associated rotating rod;
    said blades of said plurality of pairs of blades each being adapted to be continuously self-adjusting when impacted by wind for insuring that at least one sail formed by blades on one side of said vertical output shaft is always in an optimal driving position, whereas the opposite sail formed by blades on the other side of said vertical output is in a leeward position, whereby each pair of blades in unison with the other pairs of blades of said plurality of blades are responsive to both gravity and wind forces for rotating said vertical output shaft; and a spring-type mechanism individually mounted on a portion of each rod on opposing sides of said output shaft for both securing associated blades in place when they are in their optimal driving position, and for forcing the wind driven blades of each pair of blades to narrow the angle between their horizontal opposing blades to less than 90 degrees under extreme-wind conditions so that the area of wind reception is reduced in order to protect the blades, as well as the entire structure, from damage.

7. The device of claim 6, wherein the center of the weight of each blade is offset from the associated horizontal rod, thereby enhancing the self-adjustment feature of said blades to provide that for each pair of blades when impacted by wind, one blade thereof rotates with its associated rod to a driving position with its main surface area perpendicular to the wind for maximizing the wind force against it, and its associated opposite blade rotates with the associated rod to a leeward position with its main surface area parallel to the wind.

8. The device of claim 7, wherein each blade of said plurality of pairs of blades has an airfoil shape, whereby blades in a leeward position each have a leading airfoil edge parallel to the wind for minimizing the wind force against it.

9. The device of claim 6, further including:

a device operable by rotational force, whereby said vertical output shaft has an end secured to a rotational member of said device, thereby providing rotational energy to said device.

* * * * *